United States Patent
Keller et al.

(10) Patent No.: US 10,837,400 B2
(45) Date of Patent: Nov. 17, 2020

(54) METHOD FOR MANUFACTURING A PISTON

(71) Applicant: Mahle International GmbH, Stuttgart (DE)

(72) Inventors: Klaus Keller, Lorch (DE); Rainer Scharp, Vaihingen (DE)

(73) Assignee: Mahle International GmbH (DE)

(*) Notice: Subject to any disclaimer, the term of this patent is extended or adjusted under 35 U.S.C. 154(b) by 19 days.

(21) Appl. No.: 15/796,723

(22) Filed: Oct. 27, 2017

(65) Prior Publication Data

US 2018/0119636 A1    May 3, 2018

(30) Foreign Application Priority Data

Oct. 28, 2016    (DE) .................. 10 2016 221 352

(51) Int. Cl.

| | |
|---|---|
| F02F 3/00 | (2006.01) |
| F02F 3/16 | (2006.01) |
| F02F 3/22 | (2006.01) |
| B23K 20/12 | (2006.01) |
| B23K 26/21 | (2014.01) |
| B21K 1/18 | (2006.01) |
| B23K 101/00 | (2006.01) |

(52) U.S. Cl.
CPC .............. F02F 3/16 (2013.01); B21K 1/185 (2013.01); B23K 20/12 (2013.01); B23K 20/129 (2013.01); B23K 26/21 (2015.10); F02F 3/22 (2013.01); B23K 2101/003 (2018.08); F02F 2003/0061 (2013.01)

(58) Field of Classification Search
CPC ...... F02F 3/003; F02F 2003/0061; F02F 3/16; B21K 1/185

USPC ....................................... 123/193.6
See application file for complete search history.

(56) References Cited

U.S. PATENT DOCUMENTS 3,189,010 A * 6/1965 Isley .................. F02B 23/0675
                                                      123/279
4,662,319 A * 5/1987 Ayoul ..................... F02F 3/22
                                                      123/41.35

(Continued)

FOREIGN PATENT DOCUMENTS

| DE | 4331649 A1 | 3/1995 |
|---|---|---|
| DE | 19929102 A1 | 12/2000 |

(Continued)

OTHER PUBLICATIONS

English abstract for DE-4331649.
English abstract for DE-19929102.

Primary Examiner — Long T Tran
Assistant Examiner — James J Kim
(74) Attorney, Agent, or Firm — Fishman & Stewart PLLC

(57) ABSTRACT

A method for manufacturing a piston of an internal combustion engine from a piston upper part and a piston lower part may include producing at least the piston lower part as a forged steel part. A partial cross section of a cooling duct may be provided in the piston lower part. A closed supply inlet funnel may be forged within the piston lower part. The closed supply inlet funnel may be bored into the piston lower part from the cooling duct. A borehole may be introduced into the piston lower part obliquely to a piston axis. The piston lower part and the piston upper part may be welded to one another.

18 Claims, 2 Drawing Sheets

(56) References Cited

U.S. PATENT DOCUMENTS

| | | | | |
|---|---|---|---|---|
| 6,003,479 A * | 12/1999 | Evans | ............... | F02F 3/0015 123/41.31 |
| 6,651,549 B2 * | 11/2003 | Zhu | ............... | F02F 3/003 92/186 |
| 6,722,263 B2 | 4/2004 | Keller et al. | | |
| 7,308,850 B2 * | 12/2007 | Scharp | ............... | F16J 1/09 92/186 |
| 8,631,572 B2 * | 1/2014 | Seifried | ............... | B21J 5/002 29/888.04 |
| 8,807,109 B2 * | 8/2014 | Muscas | ............... | F02F 3/003 123/193.6 |
| 10,227,948 B2 * | 3/2019 | Menotti | ............... | F02F 3/003 |
| 2001/0025568 A1 * | 10/2001 | Kemnitz | ............... | F02F 3/003 92/186 |
| 2002/0178910 A1 * | 12/2002 | Keller | ............... | F02F 3/22 92/208 |
| 2003/0037671 A1 * | 2/2003 | Zhu | ............... | F02F 3/003 92/231 |
| 2003/0051694 A1 * | 3/2003 | Gaiser | ............... | F02F 3/22 123/193.6 |
| 2011/0192023 A1 | 8/2011 | Seifried et al. | | |
| 2012/0037112 A1 * | 2/2012 | Muscas | ............... | F02B 23/0672 123/193.6 |
| 2012/0145112 A1 * | 6/2012 | Scharp | ............... | F02F 3/22 123/193.6 |
| 2014/0130767 A1 * | 5/2014 | Leitl | ............... | F02F 3/22 123/193.6 |
| 2014/0230646 A1 * | 8/2014 | Schneider | ............... | F02F 3/22 92/172 |
| 2015/0075456 A1 * | 3/2015 | Weinenger | ............... | F16J 1/09 123/41.37 |

FOREIGN PATENT DOCUMENTS

| | | |
|---|---|---|
| DE | 102009056917 A1 | 6/2011 |
| DE | 102010053925 A1 | 6/2012 |

* cited by examiner

METHOD FOR MANUFACTURING A PISTON

CROSS-REFERENCE TO RELATED APPLICATIONS

This application claims priority to DE 10 2016 221 325.0 filed on Oct. 28, 2016, contents of which are hereby incorporated by reference in their entirety.

TECHNICAL FIELD

The present invention relates to a method for manufacturing a piston of an internal combustion engine, comprising a piston upper part and a piston lower part. The invention further relates to a piston manufactured according to this method, as well as to an internal combustion engine with at least one such piston.

In order to increase the retention degree of cooling oil in the cooling duct of a piston, so-called funnels are often provided on or attached to the cooling oil inlet. In the case of cast aluminium pistons the funnel-shaped cooling oil inlet can be made by way of example by a correspondingly configured salt or sand core or by a correspondingly shaped spindle sleeve. In the case of steel pistons however, often separate funnel elements are used which are bonded by way of example to a cooling duct cover.

BACKGROUND

From DE 199 29 102 A1 a cast one-piece aluminium piston is known for an internal combustion engine having an annularly mounted cooling duct which has inlet and outlet openings and wherein the cooling oil can be supplied as a free oil jet through a cooling oil nozzle via an inlet channel into the inlet opening and thus into the cooling duct of the piston. The cooling duct itself has at least three openings wherein, seen in the plane of the cooling duct, two supply inlet openings, which are to be used in alternation, are arranged opposite the one outlet opening in such a way that the openings are arranged symmetrically relative to a centre axis running through the outlet opening. A significantly better cooling action is achieved hereby. In the region of the inlet openings there are funnel-shaped elements which are formed by a corresponding salt or sand core or corresponding spindle sleeve.

From U.S. Pat. No. 6,722,263 B2 a steel piston is known having a circumferential cooling duct wherein the cooling duct is covered at the bottom by a cooling duct cover. A funnel element is inserted into the cooling duct cover in the region of an inlet opening in order to be able to increase the retention degree of cooling oil.

Apart from one-piece or integral pistons, pistons with a particularly difficult geometry are often also assembled from a piston upper part and a piston lower part and are thereby made as a structured piston. The separation into the piston upper part and the piston lower part then has the advantage of being able to correct any difficult geometries. Connecting the piston upper part to the piston lower part is then normally carried out by welding.

The drawback with the piston known from the prior art is however that these, where the piston is made, more particularly cast, in one piece, cannot reproduce more complicated cooling duct geometries, or can only reproduce the latter with very expensive cores and casting moulds. If by way of example with a cooling duct having a cooling duct cover a funnel element is positioned as a cooling oil collecting funnel in the region of an inlet opening, then this requires a complicated fastening in order to be able to reliably prevent it from falling out or twisting.

In a piston which is made up of a piston upper part and a piston lower part a supply inlet was normally introduced into the piston lower part from underneath by means of a bore. Since the coordinate of the injection nozzle is predetermined in the internal combustion engine (this is in part very close to a ring part of the piston), a type of blind hole is produced, often also restricted or defined by a welding bead whereby the oil can unfavourably rebound here and thereby not be directed efficiently into the cooling duct.

SUMMARY

The present invention is therefore concerned with the problem of providing for a method of the generic type an improved or at least an alternative embodiment which enables more particularly a simplified method of producing a highly functional piston.

This problem is solved according to the invention by the subject of independent Claim 1. Advantageous embodiments are the subject of the dependent claims.

The present invention is based on the general idea of configuring a piston first as a constructed piston with a forged piston lower part wherein a closed supply inlet funnel is forged in the piston lower part into a cooling duct by means of a corresponding forging tool, and is then drilled in from the top, that is from the cooling duct. By subsequently drilling from the side of the cooling duct it is possible to form an oblique bore at a distance from the ring part whereby an improved injection behaviour of the cooling oil can be reached. The piston lower part and the piston upper part are then still welded to one another in a known way. With the method according to the invention at least the piston lower part is thus produced as a forged steel part wherein a partial cross section of a cooling duct is arranged in the piston lower part and a closed supply inlet funnel is forged. The partial cross section of the cooling duct can then obviously also be forged or at least pre-forged and then finished by stock-removal work. The closed supply inlet funnel is however forged in each case. A corresponding forging tool is used for this. The closed supply inlet funnel in the piston lower part is then drilled from the cooling duct, that is from above, wherein as a result of the open cooling duct the drill can be placed obliquely, differently from the case of drilling from the shaft side where it had to be guided practically parallel to the piston axis. By setting the drill obliquely it is possible to achieve in particular an increased cooling oil retention degree, since drilling need no longer be carried out as before from below as blind hole drilling and by way of example ends underneath a subsequent welding bead which normally causes the cooling oil to rebound and thus leads to a lower retention degree. As the last method step the piston lower part and the piston upper part are still welded to one another wherein obviously a partial cross section of the cooling duct is likewise provided in the piston upper part. The cooling duct is formed together with the partial cross section of the cooling duct in the piston lower part. Thus with the method of manufacture according to the invention two important advantages are achieved. On the one hand there is a more favourable supply inflow into the cooling duct whereby more cooling oil can be introduced into the cooling duct and the latter can be better cooled, and on the other the piston lower part need no longer be clamped round when drilling the closed supply inlet funnel, which was hitherto necessary since the clamping jaws held the piston or piston lower part from underneath during the preceding machining step. By drilling the supply inlet funnel obliquely it is possible more particularly also to avoid ending the borehole underneath the welding bead, which up until now could have caused the cooling oil injected into the cooling duct to rebound. The borehole introduced obliquely from above furthermore has the advantage that this can also be introduced without problems in the case of laser-welded steel pistons wherein a ring element is used which lies inside in relation to a combustion bowl.

With an advantageous embodiment of the solution according to the invention the piston lower part and the piston upper part are connected to one another by a friction welding joint or by means of laser welding. Both of the said welding methods enable a high-quality and at the same time commercially viable and cyclically optimized connection of the two piston parts to one another and are already proven over many years.

The present invention is further based on the general idea of providing a piston which was manufactured according to the method previously described. A piston of this kind has the great advantage that it has both a supply inlet funnel in the piston lower part and also a borehole connecting this to the cooling duct, wherein the borehole runs obliquely to the piston axis and therefore, not as up until now in the case of a borehole guided at the edge of the piston and parallel to the piston axis, ends underneath a welding bead which runs between the piston lower part and the piston upper part. Through the oblique borehole it is possible to achieve in particular a clearly better supply flow into the cooling duct whereby more cooling oil passes into the cooling duct and the piston can be better cooled.

The piston lower part expediently has a piston shaft and the piston upper part a combustion bowl and a ring part. As an alternative to this it is obviously also conceivable that the piston lower part has a piston shaft, as well as a ring part and a part of a combustion bowl, whilst the piston upper part only forms a part of the combustion bowl. The last case represents here a piston in which the piston upper part and the piston lower part are welded to one another by means of a laser-welded connection. The embodiment of the piston according to the invention can thus be used both for friction-welded and also for laser-welded pistons.

Further important features and advantages of the invention are apparent from the dependent claims, from the drawings and from the associated description of the figures with reference to the drawings.

It is obvious that the features mentioned above and still to be explained below can be used not only in the combination mentioned, but also in other combinations or stand-alone, without departing from the scope of the present invention.

Preferred exemplary embodiments of the invention are shown in the drawings and will be explained in further detail below in the following description, wherein the same reference numerals refer to the same or similar or functionally identical components.

DETAILED DESCRIPTION

Figure 1:
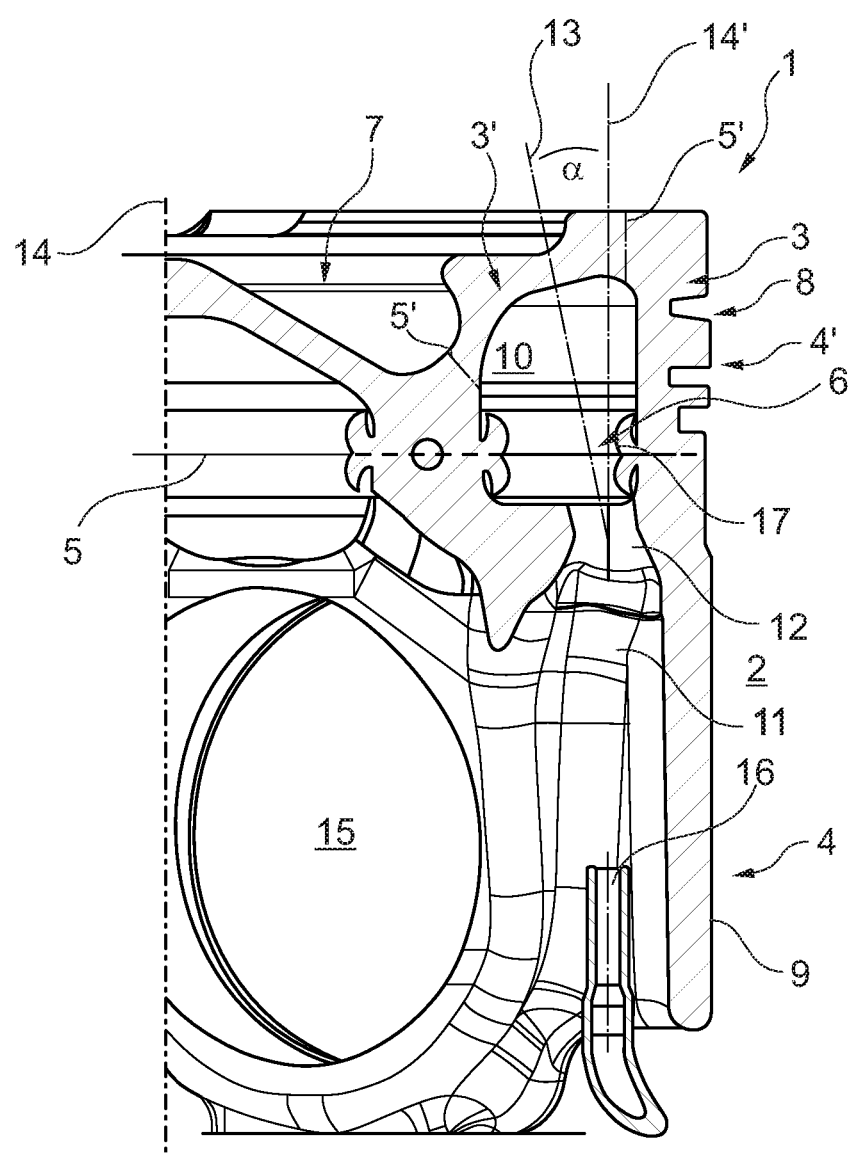
FIG. 1 shows diagrammatically in a longitudinal sectional view a piston according to the invention manufactured by means of a method according to the invention.
Figure 2:
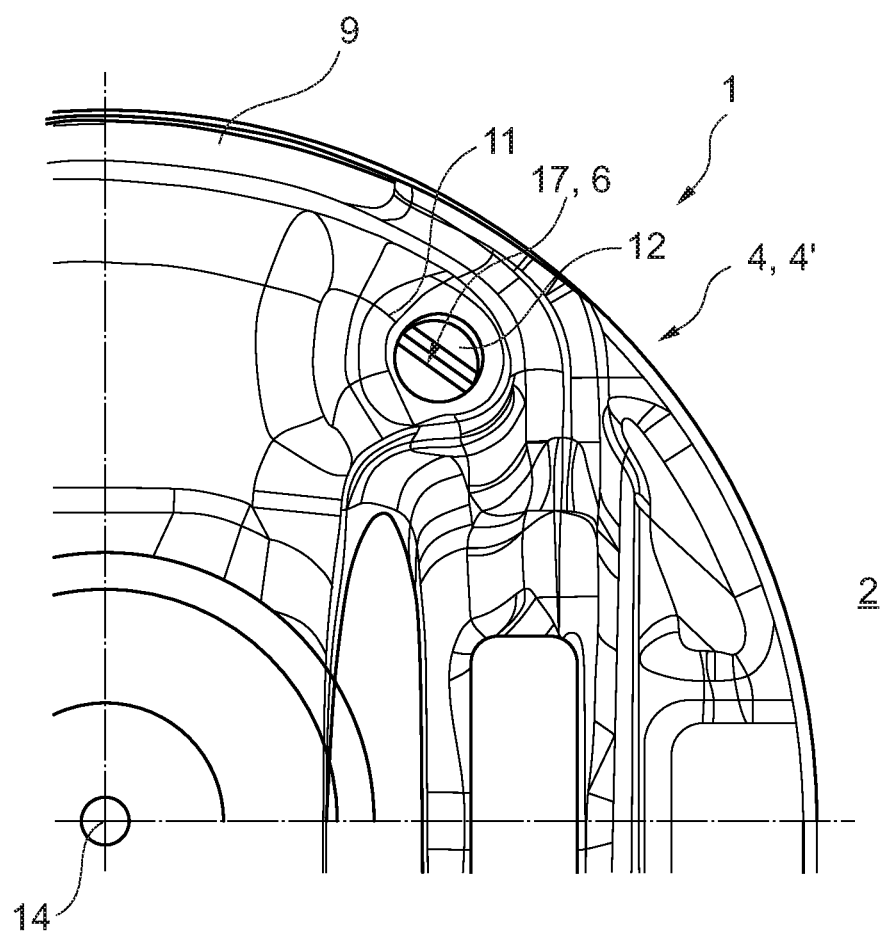
FIG. 2 shows a view from below of the piston according to the invention.

In accordance with FIG. 1 and in part also FIG. 2, a piston 1 according to the invention of an internal combustion engine 2, not shown elsewhere, comprises a piston upper part 3, 3' as well as a piston lower part 4, 4'. Here according to FIG. 1 two structural types of the piston 1 according to the invention are combined in principle. According to a first embodiment according to the invention the piston 1 comprises a piston lower part 4 with a piston shaft 9 which is separated from a piston upper part 3 via a separating plane 5 in the region of a friction-welded connection 6. The piston lower part 4 has in this case a piston shaft 9 and a bolt borehole 15. The piston upper part 3 on the other hand comprises both a combustion bowl 7 and also a ring part 8. With the piston 1 according to the second embodiment according to the invention the piston lower part 4' and the piston upper part 3', which are separated from one another via two separating planes 5' and are welded to one another via these planes, interact with one another. In this case the piston lower part 4' not only has the piston shaft 9 and the bolt borehole 15 but in addition also the ring part 8 and a part of the combustion bowl 7. The piston upper part 3' on the other hand only forms a part of the combustion bowl 7. However for the method according to the invention and the piston 1 according to the invention the different division of the piston upper parts 3, 3' and the piston lower parts 4, 4' is of no significance.

As can be further seen from FIG. 1 the piston lower part 4, 4' comprises a partial cross section of a cooling duct 10 as well as supply inlet funnel 11. The supply inlet funnel 11 helps to catch cooling oil sprayed out from an injection nozzle 16, and direct it into the cooling duct 10. The supply inlet funnel 11 is connected to the cooling duct 10 via a borehole 12 whose axis 13 runs inclined to a piston axis 14 of the piston 1. The incline of the borehole 12 has the great advantage here that the latter can be introduced from the side of the cooling duct, that is in the present case from above, and as a result of its oblique alignment guides a cooling oil jet sprayed out from the injection nozzle 16 past a welding bead 17 of the friction-welded connection 6 and then into the cooling duct 10. The oblique arrangement of the borehole 12 is possible here independently of the embodiment of the piston upper part 3, 3' and piston lower part 4, 4' respectively.

With the pistons known hitherto from the prior art, the borehole 12 had to always be introduced from below, that is from a shaft side of the piston 1, whereby this mostly ended underneath the welding bead 17 of the friction-welded connection 6 and the welded bead 17 thereby unfavourably restricted a channel cross section of the borehole 12 and thus prevented collecting the cooling oil at least in part.

The piston 1 according to the invention is manufactured here as follows:

First at least the piston lower part 4,4' is manufactured as a forged steel part wherein a partial cross section of the cooling duct 10 is arranged in the piston lower part 4, 4' and a closed supply inlet funnel 11 is forged. Naturally here also both the partial cross section of the cooling duct 10 and also the closed supply inlet funnel 11 can be forged. Obviously alternatively it is also conceivable that a preform of the partial cross section of the cooling duct 10 is forged and the final contour of the cooling duct 10 is made by stock-removing work. This closed supply inlet funnel 11 is then drilled in the piston lower part 4, 4' from the cooling duct 10, namely by means of a borehole 12 running obliquely to the piston axis 14 of the piston 1. If this happens, the piston lower part 4, 4' and the piston upper part 3, 3' are welded to one another, either through a laser-welded connection or a friction-welded connection 6. Obviously it is then conceivable that the piston upper part 3, 3' is also made as a forged steel part, wherein a partial cross section of the cooling duct 10 can be forged in on the piston upper part 3, 3'. The partial cross section of the cooling duct 10 can then be pre-forged, finished-forged or however also be made completely by stock-removal work.

With the piston 1 according to the invention and with the method of manufacture according to the invention initially a forged two-part steel piston can be provided with clearly improved cooling behaviour since it is possible to achieve through the inclined borehole 12 a clearly improved injection of cooling oil into the cooling duct 10 and thus a clearly improved cooling action. On the other hand, the borehole 12 can also be made from above so that no clamping of the piston lower part 4, 4' need be undertaken. The borehole 12 which is to be introduced obliquely is here independent of the embodiment of the piston upper part 3, 3' or piston lower part 4, 4' so that even with a laser-welded piston 1 with a piston upper part 3' forming only one part of the combustion bowl 7 sufficient space remains for introducing the borehole 12. Through the obliquely running borehole 12, particularly in the case of a friction-welded piston 1, the borehole can be covered at least partially by a welded bead 17 of the friction-welded connection 6 and thereby has no negative effect on the flow behaviour.

In FIG. 2 it can be seen by way of example that the welded bead 17 engages only slightly into the cross section of the borehole 12 and thereby has a significantly less adverse effect on the injection of the cooling oil into the cooling duct 10 than previously.

In FIG. 1 for a clearer view of the angle α between the piston axis 14 and the borehole axis 13, the piston axis 14 is moved parallel up to the axis 14'. Between the axis 14' of the piston 1 and the axis 13 of the borehole 12 an angle α exists here which in the illustrated example amounts to about 12.5°, preferably is inclined by α<15° in relation to the piston axis (14) of the piston (1), preferably by an angle α in a range from $5°<α<12.5°$.

The invention claimed is:

1. A method for manufacturing a piston of an internal combustion engine from a piston upper part and a piston lower part comprising:
   producing at least the piston lower part as a forged steel part provided with a partial cross section of a cooling duct, and forging a closed supply inlet funnel in the piston lower part underneath the partial cross section of the cooling duct relative to the piston upper part;
   boring the closed supply inlet funnel into the piston lower part from the cooling duct towards the closed supply inlet funnel by drilling a borehole through the piston lower part obliquely to a piston axis to form a supply inlet funnel connected to the cooling duct via the borehole;
   welding the piston lower part and the piston upper part to one another; and
   wherein drilling the borehole through the piston lower part obliquely to the piston axis includes forming an axis of the borehole to extend into the cooling duct inclined radially inwards to the piston axis, and wherein the axis of the borehole extends into the cooling duct radially inwards of an outer welding bead at an incline of less than 15° relative to the piston axis.

2. The method according to claim 1, wherein the piston lower part and the piston upper part are welded to one another via a friction-welding connection.

3. The method according to claim 1, wherein the piston lower part and the piston upper part are welded to one another via laser-welding.

4. The method according to claim 1, further comprising producing the piston upper part as a forged steel part, and forging a second partial cross section of the cooling duct in the piston upper part.

5. The method of claim 1, wherein drilling the borehole through the piston lower part obliquely to the piston axis includes guiding a drill obliquely to the piston axis from above the partial cross section of the cooling duct into the closed supply inlet funnel to form the supply inlet funnel connected to the cooling duct via the borehole.

6. The method according to claim 1, wherein the axis of the borehole extends into the cooling duct radially inwards of a piston ring part at an incline of less than 15° relative to the piston axis.

7. The method according to claim 1, wherein drilling the borehole through the piston lower part obliquely to the piston axis includes introducing the borehole in a direction running from the partial cross section of the cooling duct towards an interior of the piston lower part and into the closed supply inlet funnel to form the supply inlet funnel.

8. The method according to claim 1, wherein the axis of the borehole is inclined radially inwards by an angle of $5°<α<12.5°$ relative to the piston axis.

9. A piston comprising:
   a forged steel piston lower part having a first partial cross section of a cooling duct disposed therein;
   a piston upper part having a second partial cross section of the cooling duct disposed therein;
   a supply inlet funnel provided in the piston lower part and disposed underneath the cooling duct relative to the piston upper part;
   a borehole defined within the piston lower part and extending obliquely to a central piston axis, the borehole connecting the supply inlet funnel and the cooling duct;
   wherein the piston upper part is welded to the piston lower part;
   wherein the borehole has an axis extending into the cooling duct that is inclined radially inwards to the central piston axis; and
   wherein the cooling duct includes a radially outer welding bead, and wherein the axis of the borehole extends into the cooling duct radially inwards of the welding bead at an incline of less than 15° relative to the central piston axis.

10. The piston according to claim 9, wherein the piston lower part includes a piston shaft protruding from the piston lower part axially away from the piston upper part relative to the central piston axis, the piston shaft extending around an outer circumferential edge of the piston lower part relative to the central piston axis defining an interior of the piston lower part.

11. The piston according to claim 9, wherein the piston upper part further includes a combustion bowl and a ring part.

12. The piston according to claim 9, wherein the piston lower part further includes a ring part and a first portion of a combustion bowl; and
   the piston upper part forms a second portion of the combustion bowl.

13. The piston according to claim 9, wherein the axis of the borehole is inclined radially inwards by an angle α<15° to the central piston axis in a direction running from the supply inlet funnel to the cooling duct.

14. An internal combustion engine with at least one piston according to claim 9.

15. The piston according to claim 9, wherein the axis of the borehole is inclined radially inwards by an angle $5°<\alpha<12.5°$ to the central piston axis in a direction running from the supply inlet funnel to the cooling duct.

16. The piston according to claim 9, wherein the axis of the borehole extends into the first partial cross section radially inwards of a radially outer wall of the cooling duct.

17. A piston comprising:
- a forged steel piston lower part having a first partial cross section of a cooling duct disposed therein;
- a supply inlet funnel provided in the piston lower part;
- a borehole defined within the piston lower part and extending obliquely to a piston axis, the borehole connecting the supply inlet funnel and the cooling duct; and
- a piston upper part having a second partial cross section of the cooling duct disposed therein;
- wherein the piston upper part is welded to the piston lower part;
- wherein the borehole extends inclined radially inwards to the piston axis from the supply inlet funnel towards the cooling duct; and
- wherein the cooling duct includes a radially outer welding bead, and wherein the borehole has an axis extending into the cooling duct radially inwards of the radially outer welding bead at an incline of less than 15° relative to the piston axis.

18. The piston according to claim 17, wherein the axis of the borehole is inclined by an angle of $5°<\alpha<12.5°$ relative to the piston axis.

* * * * *